(12) United States Patent
Kim et al.

(10) Patent No.: US 11,231,219 B2
(45) Date of Patent: Jan. 25, 2022

(54) REFRIGERATOR AND CONTROL METHOD OF REFRIGERATOR

(71) Applicant: LG Electronics Inc., Seoul (KR)

(72) Inventors: Sungwook Kim, Seoul (KR); Sangbok Choi, Seoul (KR); Wookyung Baik, Seoul (KR); Kyongbae Park, Seoul (KR)

(73) Assignee: LG Electronics Inc., Seoul (KR)

( * ) Notice: Subject to any disclaimer, the term of this patent is extended or adjusted under 35 U.S.C. 154(b) by 91 days.

(21) Appl. No.: 16/348,711

(22) PCT Filed: Nov. 10, 2017

(86) PCT No.: PCT/KR2017/012739
§ 371 (c)(1),
(2) Date: May 9, 2019

(87) PCT Pub. No.: WO2018/088845
PCT Pub. Date: May 17, 2018

(65) Prior Publication Data
US 2019/0285331 A1  Sep. 19, 2019

(30) Foreign Application Priority Data
Nov. 10, 2016  (KR) .................. 10-2016-0149421

(51) Int. Cl.
*F25D 21/00* (2006.01)
*F25D 17/06* (2006.01)
(Continued)

(52) U.S. Cl.
CPC ........... *F25D 21/008* (2013.01); *F25D 17/06* (2013.01); *F25D 17/062* (2013.01);
(Continued)

(58) Field of Classification Search
CPC ...... F25D 21/02; F25D 2700/10; F25D 29/00; F25D 21/08; F25D 21/025; F25D 21/002; F25D 17/067; F25D 17/062; F25D 21/008
See application file for complete search history.

(56) References Cited

U.S. PATENT DOCUMENTS 2,975,611 A  3/1961  Pietsch
3,299,237 A  1/1967  Sorensen et al.
(Continued)

FOREIGN PATENT DOCUMENTS

CN  1576750  2/2005
KR  0120536 B1 * 10/1997
(Continued)

OTHER PUBLICATIONS

KR-0120536-B1 Translation (Year: 1997).*
(Continued)

*Primary Examiner* — Schyler S Sanks
(74) *Attorney, Agent, or Firm* — Fish & Richardson P.C.

(57) ABSTRACT

The present invention provides a control method of a refrigerator, comprising: a first defrosting step of defrosting an evaporator and terminating the defrosting when the evaporator reaches a first temperature; a step of detecting pressure difference by means of a differential pressure sensor for measuring pressure difference between a first thru-hole, disposed between the evaporator and an inlet through which air flows in from a storage compartment, and a second thru-hole disposed between the evaporator and an outlet through which the air is discharged into the storage compartment; and a second defrosting step of additionally defrosting the evaporator if the measured pressure difference is greater than a configured pressure.

12 Claims, 8 Drawing Sheets

(51) Int. Cl.
    *F25D 21/02*     (2006.01)
    *F25D 21/08*     (2006.01)
    *F25D 29/00*     (2006.01)

(52) U.S. Cl.
    CPC ........... *F25D 17/067* (2013.01); *F25D 21/00* (2013.01); *F25D 21/002* (2013.01); *F25D 21/02* (2013.01); *F25D 21/025* (2013.01); *F25D 21/08* (2013.01); *F25D 29/00* (2013.01); *F25D 2700/10* (2013.01)

(56) References Cited

U.S. PATENT DOCUMENTS

| | | |
|---|---|---|
| 3,309,887 A | 3/1967 | Jacobus |
| 3,377,817 A | 4/1968 | Petranek |
| 4,007,603 A | 2/1977 | Gustafsson |
| 2013/0160471 A1* | 6/2013 | Worley ................ F25D 21/006 62/81 |

FOREIGN PATENT DOCUMENTS

| | | | |
|---|---|---|---|
| KR | 100120536 | 10/1997 | |
| KR | 1019980010300 | 4/1998 | |
| KR | 100304907 | 9/2001 | |
| KR | 100652775 | 12/2006 | |
| KR | 101463041 | 11/2014 | |
| WO | WO-2007072523 A1 * | 6/2007 | ........... F25D 21/006 |

OTHER PUBLICATIONS

MIT OpenCourseWare Dynamics and Control II (Year: 2008).*
Chinese Office Action in Chinese Application No. 201780068330.6, dated Jun. 17, 2020, 18 pages (with English translation).
Extended European Search Report in European Application No. 17868985.7, dated Jul. 30, 2020, 8 pages.
PCT International Search Report and Written Opinion in International Application No. PCT/KR2017/012739, dated Jan. 31, 2018, 14 pages (English translation).

* cited by examiner

REFRIGERATOR AND CONTROL METHOD OF REFRIGERATOR

CROSS-REFERENCE TO RELATED APPLICATIONS

This application is a National Stage application under 35 U.S.C. § 371 of International Application No. PCT/KR2017/012739, filed on Nov. 10, 2017, which claims the benefit of Korean Application No. 10-2016-0149421, filed on Nov. 10, 2016. The disclosures of the prior applications are incorporated by reference in their entirety.

TECHNICAL FIELD

The present disclosure relates to a refrigerator, and a method for controlling the same, and more particularly to a refrigerator having improved energy efficiency and a method for controlling the same.

BACKGROUND

In general, a refrigerator includes a machinery compartment, which is located at the lower part of a main body of the refrigerator. The refrigerator is generally installed at the lower part of the refrigerator in consideration of the center of gravity of the refrigerator and in order to improve assembly efficiency and to achieve vibration reduction.

A refrigeration cycle device is installed in the machinery compartment of the refrigerator in order to keep the interior of the refrigerator frozen/refrigerated using the property of a refrigerant, which absorbs external heat when a low-pressure liquid refrigerant is changed to a gaseous refrigerant, whereby food is kept fresh.

The refrigeration cycle device of the refrigerator includes a compressor for changing a low-temperature, low-pressure gaseous refrigerant to a high-temperature, high-pressure gaseous refrigerant, a condenser for changing the high-temperature, high-pressure gaseous refrigerant, changed by the compressor, to a low-temperature, low-pressure liquid refrigerant, and an evaporator for changing the low-temperature, high-pressure liquid refrigerant, changed by the condenser, to a gaseous refrigerant in order to absorb external heat.

When the compressor is driven, the temperature of the evaporator is lowered, whereby ice may be formed on the evaporator. In the case in which the amount of ice formed on the evaporator increases, the efficiency of heat exchange between the evaporator and air is lowered, whereby it is difficult to smoothly cool air to be supplied to a storage compartment. As a result, it is necessary to drive the compressor a larger number of times and for a larger amount of time.

In addition, when ice is formed on the evaporator, a heater is driven in order to remove the ice from the evaporator. In the case in which the heater is unnecessarily frequently driven, the amount of power consumed by the refrigerator increases.

In particular, power consumption of refrigerators produced in recent years has increased as the result of an increase in the storage capacity of the refrigerators. Research has thus been conducted into the reduction of power consumption.

DISCLOSURE

Technical Purpose

The present disclosure is to provide a refrigerator with improved energy efficiency and a method for controlling the refrigerator.

Further, the present disclosure is to provide a refrigerator with improved energy efficiency and a method for controlling the refrigerator, in which different defrosting operations are performed depending on frosted amounts in the evaporator.

Furthermore, the present disclosure is to provide a refrigerator with improved energy efficiency and a method for controlling the refrigerator, in which, when it is determined that after performing a first defrosting, the defrosted amount is not sufficient, a second defrosting is performed.

Technical Solution

In one aspect of the present disclosure, there is provided a method for controlling a refrigerator, the method comprising: determining whether a defrosting triggering condition for an evaporator is satisfied; upon determination that the defrosting triggering condition is satisfied, detecting a pressure differential using a single differential pressure sensor, wherein the pressure differential is a difference between pressures in first and second through-holes, wherein the first through-hole is defined between an inlet for receiving air from a storage compartment and the evaporator, wherein the second through-hole is defined between an outlet for discharging air into the storage compartment and the evaporator; and performing a defrosting operation varying based on the measured pressure differential.

In one embodiment, the defrosting operation includes driving a heater to heat the evaporator.

In one embodiment, the defrosting operation is configured such that: when the measured pressure differential is greater than the specific pressure, the evaporator is allowed to rise to a first predefined temperature; when the measured pressure differential is smaller than the specific pressure, the evaporator is allowed to rise to a second predefined temperature.

In one embodiment, the first predefined temperature is higher than the second predefined temperature.

In one embodiment, an evaporator temperature sensor installed in the evaporator measures a temperature of the evaporator.

In one embodiment, the defrosting operation is configured such that: a heat amount from the heater to the evaporator when the measured pressure differential is greater than a specific pressure is smaller than a heat amount from the heater to the evaporator when the measured pressure differential is smaller than the specific pressure.

In one embodiment, when the measured pressure differential is greater than the specific pressure, the heater is driven continuously until the defrosting operation is terminated.

In one embodiment, when the measured pressure differential is smaller than the specific pressure, the heater is turned on and off repeatedly while the defrosting operation is performed.

In one embodiment, the heater is continuously driven until a temperature of the evaporator rises to a specific temperature.

In one embodiment, after the evaporator temperature rises to a specific temperature, the heater is intermittently driven.

In one embodiment, the method further comprises performing a normal operation for cooling the storage compartment after the defrosting operation is terminated.

In one embodiment, the normal operation first cools the storage compartment to a set temperature after the defrosting operation is terminated.

In one embodiment, the normal operation is configured such that: when the measured pressure differential is greater than a specific pressure, a compressor is driven to generate a relatively higher cooling power; when the measured pressure differential is smaller than the specific pressure, the compressor is driven to generate a relatively lower cooling power.

In one embodiment, a revolutions per minute of the compressor when the compressor generates the relatively higher cooling power is higher than a revolutions per minute of the compressor when the compressor generates the relatively lower cooling power.

In another aspect of the present disclosure, there is provided a refrigerator comprising: a cabinet having a storage compartment defined therein; a door for opening and closing the storage compartment; a case having an inlet and an outlet defined therein, wherein the case receives therein an evaporator, wherein the inlet receives air from the storage compartment, wherein the outlet discharges air into the storage compartment; a fan for generating air flow, wherein the air is introduced through the inlet and is discharged through the outlet; a differential pressure sensor disposed inside the case; and a controller configured to perform a defrosting operation of the evaporator, wherein the defrosting operation varies based on a pressure differential detected by the differential pressure sensor.

In one embodiment, the refrigerator further comprise a heater for heating the evaporator.

In one embodiment, when the pressure differential detected by the differential pressure sensor is greater than a specific pressure, the controller drives the heater to allow the evaporator to reach a higher temperature.

In one embodiment, when the pressure differential detected by the differential pressure sensor is greater than a specific pressure, the controller continues to drive the heater until the defrosting operation of the evaporator is terminated.

In one embodiment, when the pressure differential detected by the differential pressure sensor is greater than a specific pressure, the controller controls a compressor to supply a higher cooling power after the defrosting operation of the evaporator is terminated.

In one embodiment, the differential pressure sensor includes: a first through-hole defined between the evaporator and the inlet; a second through-hole defined between the evaporator and the outlet; and a body for communicating the first through hole and the second through hole, wherein the differential pressure sensor detects a pressure differential between airs in the first through-hole and the second through-hole.

In another aspect of the present disclosure, there is provided a method for controlling a refrigerator, the method comprising: performing a first defrosting operation of an evaporator, wherein the first defrosting operation terminates when a temperature of the evaporator reaches a first temperature; detecting a pressure differential using a single differential pressure sensor, wherein the pressure differential is a difference between pressures in first and second through-holes, wherein the first through-hole is defined between an inlet for receiving air from a storage compartment and the evaporator, wherein the second through-hole is defined between an outlet for discharging air into the storage compartment and the evaporator; and performing a second defrosting operation as an additional defrosting operation of the evaporator when the measured pressure differential is greater than a predefined pressure.

In one embodiment, the method further comprises, after the pressure differential detection, performing a normal operation when the measured pressure differential is smaller than a predetermined pressure, wherein in the normal operation, a compressor is driven to cool the storage compartment.

In one embodiment, when the measured pressure differential is greater than a predetermined pressure, then the normal operation is performed after the second defrosting operation is terminated.

In one embodiment, in the normal operation, a fan is driven to supply heat-exchanged air with the evaporator to the storage compartment.

In one embodiment, in each of the first defrosting operation and the second defrosting operation, a heater is driven to heat the evaporator.

In one embodiment, the first temperature is lower than the second temperature.

In one embodiment, the first temperature is equal to the second temperature.

In one embodiment, the method further comprises, between the first defrosting operation and the pressure differential detection, activating a fan to supply with heat-exchanged air with the evaporator to the storage compartment.

In one embodiment, after the fan is activated for a specific time, the pressure differential is detected.

In one embodiment, the activating of the fan is triggered after a predetermined time has elapsed since the first defrosting is terminated.

In one embodiment, in each of the first defrosting operation and the second defrosting operation, a fan to supply with heat-exchanged air with the evaporator to the storage compartment is deactivated.

In still another aspect of the present disclosure, there is provided a refrigerator comprising: a cabinet having a storage compartment defined therein; a door for opening and closing the storage compartment; a case having an inlet and an outlet defined therein, wherein the case receives therein an evaporator, wherein the inlet receives air from the storage compartment, wherein the outlet discharges air into the storage compartment; a fan for generating air flow, wherein the air is introduced through the inlet and is discharged through the outlet; a differential pressure sensor disposed inside the case; and a controller configured to determine, based on a pressure differential detected by the differential pressure sensor, whether to perform an additional defrosting operation of the evaporator.

In one embodiment, the controller controls the differential pressure sensor to measure the pressure differential after a defrosting operation to heat the evaporator.

Technical Effect

According to the present disclosure, different defrosting operations are performed depending on the frosted amounts in the evaporator such that the reliability of defrosting may be improved. Further, the higher the frosted amount in the evaporator, the more energy is consumed in defrosting. The lower the frosted amount in the evaporator, the less energy is consumed in defrosting. Thus, the energy efficiency may be improved.

Further, the compressor is driven based on the defrosting intensity to cool the storage chamber. Thus, adjusting a cooling power of the compressor based on the defrosting intensity may allow the energy consumed in cooling the storage chamber to be saved. When the defrosting intensity is strong, the storage chamber is cooled more rapidly. When the defrosting intensity is weak, the storage chamber is cooled slowly. This may prevent the temperature of the stored food in the storage chamber from rising.

Furthermore, according to the present disclosure, after performing relatively weak first defrosting, it may be determined whether the evaporator requires additional defrosting. This may avoid excessive defrosting of the evaporator unnecessarily. That is, when it is determined that additional defrosting is required in the evaporator after the first defrosting, second defrosting may be performed. This may save the energy consumed in defrosting.

Furthermore, after the first defrosting is performed, the frosted amount may be grasped in the evaporator to ensure the reliability of the evaporator defrosting.

DETAILED DESCRIPTIONS

Figure 1:
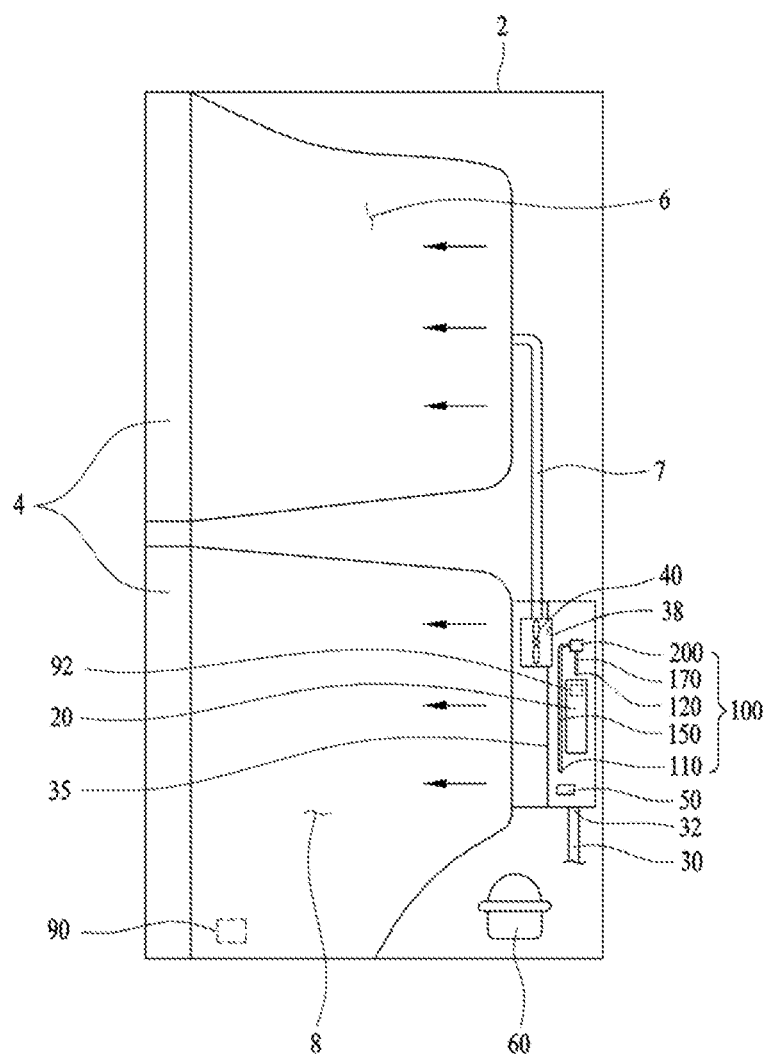
FIG. 1 is a side cut-away view showing a refrigerator according to an embodiment of the present invention.

Hereinafter, a preferred embodiment of the present disclosure, which may specifically realize the above purposes of the present disclosure, will be described with reference to the accompanying drawings.

In this connection, the size and shape of the components shown in the drawings may be exaggerated for clarity and convenience of illustration. Further, terms specifically defined in light of the configuration and functionality of the present disclosure may vary depending on the intentions or customs of the user or operator. Definitions of these terms should be based on the content throughout the present disclosure.

The use of a single differential pressure sensor according to an embodiment of the present disclosure is technically different from the use of two pressure sensors. When using two pressure sensors, the pressure differential corresponding to the two positions may be calculated using the difference between the pressures measured by the two pressure sensors respectively.

In general, a pressure sensor measures pressure in increments of 100 Pa. Since a differential pressure sensor is used in an embodiment of the present invention, it is possible to more accurately measure a difference in pressure than in the case in which a general pressure sensor is used. The differential pressure sensor cannot measure an absolute pressure value at a position at which measurement is performed but can calculate a difference in pressure between two positions. Consequently, it is possible for the differential pressure sensor to easily measure a difference in pressure in smaller increments than pressure sensors.

In addition, in the case in which two pressure sensors are used, increased costs, related to the use of two sensors, are incurred, and a large amount of resources, such as electrical wires, for installing the two sensors are needed. In contrast, in the case in which a single differential pressure sensor is used, costs and resources necessary to install the sensor may be reduced.

A differential pressure sensor is installed in a space in which air that has passed through a storage compartment is cooled by an evaporator. Air supplied from the storage compartment contains a large amount of water due to food stored in the storage compartment.

When heat exchange is performed between the air and the evaporator, therefore, a large number of water drops may be generated as the result of cooling the air. That is, the differential pressure sensor is installed in a high-humidity space.

In addition, when a refrigerant is evaporated by the evaporator, the temperature around the evaporator is very low. In contrast, when the refrigerant is not evaporated by the evaporator, the temperature around the evaporator is similar to the temperature in the storage compartment. The space in which the evaporator is installed has high temperature variation depending on the condition in which the evaporator is used.

Since the space in which the evaporator is installed has high temperature variation and high humidity, various errors may be generated, and it may be difficult to accurately measure information using general sensors. Since a differential pressure sensor is used in an embodiment of the present invention, however, it is possible to more accurately sense information even under adverse conditions than in the case in which other kinds of sensors are used.

Hereinafter, an exemplary embodiment of the present invention capable of concretely accomplishing the above objects will be described with reference to the accompanying drawings.

Figure 2:
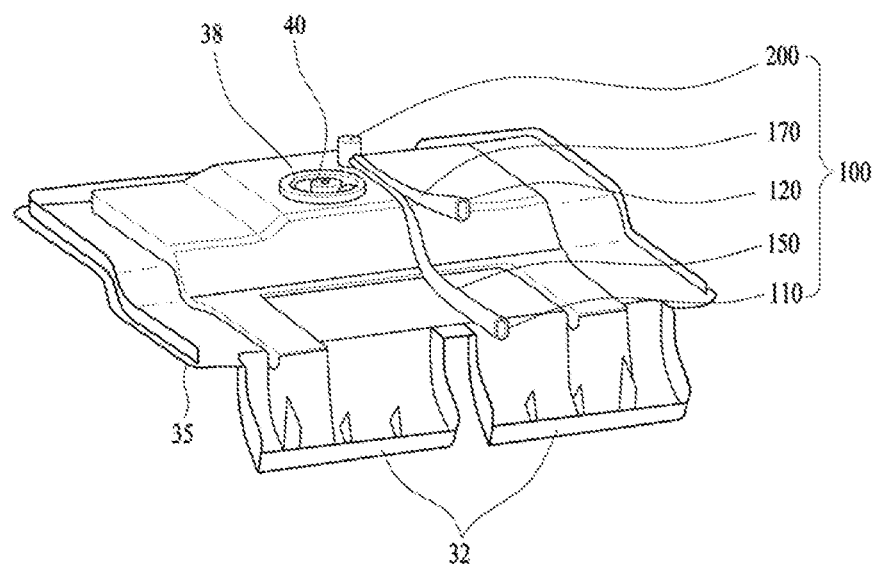
FIG. 2 is a view illustrating a principal part of FIG. 1.
Figure 3:
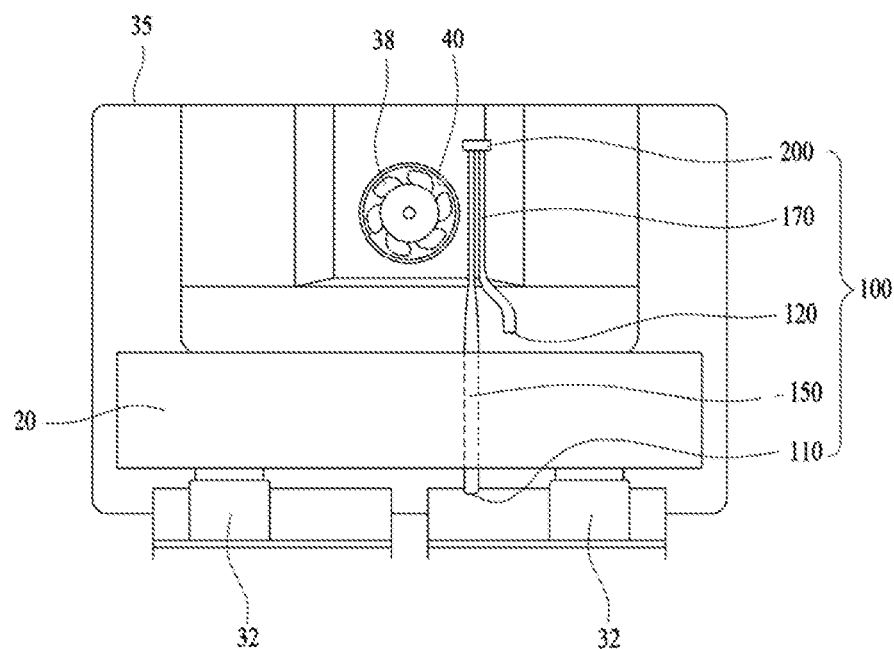
FIG. 3 is a plan view of FIG. 2.

FIG. 1 is a side cut-away view showing a refrigerator according to an embodiment of the present invention, FIG. 2 is a view illustrating a principal part of FIG. 1, and FIG. 3 is a plan view of FIG. 2. An evaporator is omitted from FIG. 2 for simplicity.

Hereinafter, a description will be given with reference to FIGS. 1 to 3.

The refrigerator includes a cabinet 2, having a plurality of storage compartments 6 and 8 defined therein, and doors 4 for opening and closing the storage compartments 6 and 8.

The storage compartments 6 and 8 include a first storage compartment 6 and a second storage compartment 8. The first storage compartment 6 and the second storage compartment 8 may constitute a refrigerating compartment and a freezing compartment, respectively. Alternatively, the first storage compartment 6 and the second storage compartment 8 may constitute a freezing compartment and a refrigerating compartment, respectively. In yet another alternative, both the first storage compartment 6 and the second storage compartment 8 may constitute refrigerating compartments or freezing compartments.

In the storage compartments 6 and 8 is provided a storage compartment temperature sensor 90 for measuring the temperature in the storage compartments 6 and 8. Alternatively, the temperature sensor 90 may be installed in each of the storage compartments 6 and 8 to individually measure the temperature in each storage compartment.

At the rear of the storage compartments is provided a case 35 for accommodating an evaporator 20.

The case 35 is provided with an outlet 38, through which air is supplied from the case 35 to the storage compartments, and with an inlet 32, through which air is supplied from the storage compartments into the case 35.

In the inlet 32 is provided an introduction pipe 30 for guiding air into the case 35. As a result, the storage compartments 6 and 8 may be connected to the case 35 in order to define an airflow path.

In the outlet 38 is provided a fan 40, which may enable air to flow from the case 35 to the storage compartments 6 and 8. The case 35 has a hermetically sealed structure, excluding the inlet 32 and the outlet 38. When the fan 40 is driven, therefore, air flows from the inlet 32 to the outlet 38.

The air having passed through the fan 40, i.e. cool air, may be supplied to the first storage compartment 6 through a duct 7 for guiding air to the first storage compartment 6. The air having passed through the fan 40 may also be supplied to the second storage compartment 8.

In the case 35 is accommodated the evaporator 20, which evaporates a refrigerant compressed by a compressor 60 in order to generate cool air. The air in the case 35 is cooled as the result of heat exchange with the evaporator 20.

Under the evaporator 20 is provided a heater for generating heat to defrost the evaporator 20. It is not necessary to install the heater 50 under the evaporator 20. It is sufficient to provide the heater in the case 35 in order to heat the evaporator 20.

An evaporator temperature sensor 92 may be provided at the evaporator 20 to measure the temperature of the evaporator 20. When the refrigerant, passing through the evaporator 20, is evaporated, the evaporator temperature sensor 92 may sense a low temperature. When the heater 50 is driven, the evaporator temperature sensor 92 may sense a high temperature.

The compressor 60 may be installed in a machinery compartment, which is provided in the cabinet 2, to compress the refrigerant that is supplied to the evaporator 20. The compressor 60 is installed outside the case 35.

The inlet 32 is located under the evaporator 20, and the outlet 38 is located above the evaporator 20. The outlet 38 is located higher than the evaporator 20, and the inlet 32 is located lower than the evaporator 20.

When the fan 40 is driven, therefore, air moves upwards in the case 35. The air, introduced into the inlet 32, undergoes heat exchange while passing through the evaporator 20, and is discharged out of the case 35 through the outlet 38.

A sensor 100 is provided in the case 36. In an embodiment, the sensor 100 includes a differential pressure sensor.

The differential pressure sensor 100 includes a first through-hole 110, disposed between the evaporator 20 and the inlet 32, and a second through-hole 120, disposed between the evaporator 20 and the outlet 38.

The differential pressure sensor 100 includes a main body for interconnecting the first through-hole 110 and the second through-hole 120. The main body includes a first pipe 150, having the first through-hole 110 formed therein, a second pipe 170, having the second through-hole 120 formed therein, and a connection member 200 for interconnecting the first pipe 150 and the second pipe 170.

The connection member 200 may be disposed higher than the evaporator 20 in order to prevent moisture condensed on the evaporator 20 from falling to the connection member 200. An electronic device may be installed at the connection member 200. If water drops fall to the connection member, the electronic device may be damaged. The water drops, formed on the evaporator 20, fall due to gravity. In the case in which the connection member 200 is disposed above the evaporator 20, the water drops formed on the evaporator 20 do not fall to the connection member 200.

Meanwhile, the first pipe 150 and the second pipe 170 may extend higher than the evaporator 20. In order to locate the connection member 200 above the evaporator 20, it is necessary for the first pipe 150 and the second pipe 170 to extend higher than the evaporator 20.

The first through-hole 110 and the second through-hole 120 may be disposed so as to face downwards, whereby it is possible to prevent the water drops condensed in the case 35 from being introduced into the first pipe 150 and the second pipe 170 through the first through-hole 110 and the second through-hole 120, respectively. If the first through-hole 110 and the second through-hole 120 are disposed so as to face upwards, water drops falling due to gravity may be introduced into the first pipe 150 and the second pipe 170 through the first through-hole 110 and the second through-hole 120, respectively, whereby the value measured by the differential pressure sensor 100 may be erroneous.

The differential pressure sensor 100 senses a difference in pressure between the air passing through the first through-hole 110 and the air passing the second through-hole 120. Since the first through-hole 110 and the second through-hole 120 are installed at different heights and the evaporator 20 is disposed therebetween, a difference in pressure occurs. A relatively low pressure is applied to the second through-hole 120, which is a low-pressure part, and a relatively high pressure is applied to the first through-hole 110, which is a high-pressure part. Consequently, the differential pressure sensor 100 senses a difference in pressure.

Since air flows in the case 35 particularly when the fan 40 is driven, the differential pressure sensor 100 may measure a difference in pressure.

Figure 4:
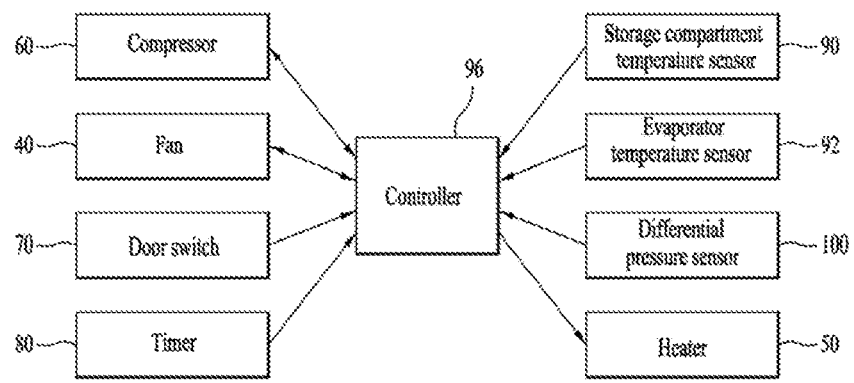
FIG. 4 shows a control block diagram according to the present disclosure.

FIG. 4 is a control block diagram according to the present disclosure.

Referring to FIG. 4, the refrigerator in accordance with the present disclosure includes the compressor 60 that may compress refrigerant. A controller 96 may drive the compressor 60 to allow cold air to be fed into the storage compartment when the controller 96 determines that the storage compartment should be cooled. Information about whether the compressor 60 is to be executed may be communicated to the controller 96.

Further, the refrigerator includes the fan 40 that generates an air flow to allow cooling air to flow into the storage compartment. Information about whether the fan 40 is to be driven may be communicated to the controller 96. The controller 96 may signal to drive the fan 40.

A door switch 70 may obtain information about whether the door 4 for opening and closing the storage compartment is to open and close the storage compartment. Each door switch 70 may be individually disposed on each door so that each door switch detects whether each door has opened or closed the storage compartment.

Further, a timer 80 may be capable of detecting an elapsing time. A time measured by the timer 80 is passed to the controller 96. For example, the controller 96 acquires, from the door switch 70, a signal indicating that the door 4 has closed the storage compartment. Then, the timer 80 detects the elapsing time since the door 4 has closed the storage compartment. Then, the controller may receive information on the elapsing time from the timer 80.

Temperature information about the storage compartment measured by a storage compartment temperature sensor 90, which may sense a temperature of the storage compartment, may also be passed to the controller 96.

When defrosting is performed, temperature information measured by an evaporator temperature sensor 92, which may also measure the temperature of the evaporator, may be passed to the controller 96. The controller 96 may terminate the defrosting of the evaporator according to the temperature information measured by the evaporator temperature sensor 92.

Further, a heater 50 for heating the evaporator is provided. The controller 96 may issue a command to drive the heater 50. When the defrosting starts, the controller 96 drives the heater 50. The controller 96 may terminate the heater 50 when defrosting is terminated.

In accordance with the present disclosure, the measured information from the differential pressure sensor 100 is transmitted to the controller 96.

Figure 5:
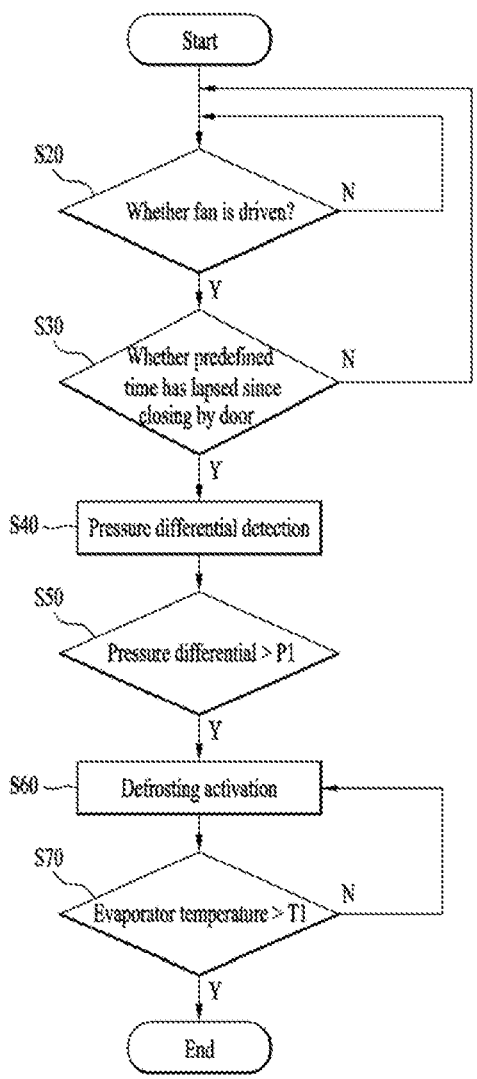
FIG. 5 is a control flow diagram for detecting a frosted amount in an evaporator according to one embodiment.

FIG. 5 is a control flow chart for detecting a frosted amount in an evaporator according to one embodiment.

Referring to FIG. 5, in one embodiment of the present disclosure, a method for controlling a refrigerator may include an operation S40 of detecting a pressure differential by the single differential pressure sensor 100, wherein the pressure differential is a difference between a pressure in the first through-hole 110 defined between the inlet 32 through which the air from the storage compartments 6 and 8 is introduced and the evaporator 20 and a pressure in the second through-hole 120 defined between the outlet 38 through which the air is discharged to the storage compartments 4 and 6 and the evaporator 20; and when the pressure differential is greater than a predetermined pressure, defrosting the evaporator 20 by driving the heater 50.

As used herein, the pressure differential may be a pressure differential value measured at one time or an average value of several measured pressure differentials. The pressure measured by the differential pressure sensor 100 may be temporarily non-normal due to various external factors. Thus, when using the average value of the pressure differentials, reliability of the pressure differential measured by the differential pressure sensor 100 may be increased.

When the differential pressure value measured by the differential pressure sensor 100 is greater than the predetermined pressure, this means that the pressure differential between the first through hole 110 and the second through-hole 120 increases. The increased pressure differential means that the frosted amount increases in the evaporator 20. This may mean that the evaporator 20 may not perform heat exchange smoothly. Therefore, defrosting may be necessary because the cooling air is not smoothly supplied from the evaporator 20 to the storage compartments 6 and 8.

Further, before performing the pressure differential detection, the controller may determine whether the fan 40 is in operation.

The fan 40 must be driven to generate an air flow between the first through hole 110 and the second through hole 120, that is, in the differential pressure sensor 100. This allows the differential pressure sensor 100 to smoothly measure the pressure differential.

Thus, when the fan 40 is not driven, the differential pressure sensor 100 may not measure the pressure differential.

The door switch 70 determines whether a predetermined time has elapsed after the door 4 closes the storage compartments 6 and 8. When a predetermined time has not elapsed, the differential pressure sensor 100 may not detect the pressure differential S30. Before the timer 80 measures the elapsing time, the door switch 70 first determines if the door 4 is closed. Then, the timer 80 may measure the elapsing time. In this connection, the elapsing time may mean approximately one minute, but the time may vary widely.

An air flow inside the case 35 when the door 4 has not closed the storage compartments 6 and 8 may be different from the air flow inside the case 35 when the door 4 has closed the storage compartments 6 and 8.

Further, When the predetermined time has not elapsed since the door 4 has closed the storage compartments 6 and 8, an unexpected airflow may be generated in the inlet 32 or the outlet 38 due to the closing of the storage compartments 6 and 8 by the door 4.

Thus, in this case, when the differential pressure sensor 100 measures the pressure differential, the measured pressure differential may not accurately reflect the internal pressure of the case 35. When such defective information is used to determine the defrosting point of the evaporator 20, the heater 50 may be driven unnecessarily frequently or the evaporator 20 may not be defrosted by driving the heater 50 at a required point in time.

Then, the differential pressure sensor 100 measures the pressure differential between the first through hole 110 and the second through-hole 120 S40. In this connection, information about the measured pressure differential may be communicated to the controller 96.

The controller 96 compares the measured pressure differential with the predetermined pressure P1 S50. When the pressure differential is greater than the predetermined pressure P1, a lot of ice is produced in the evaporator 20, and thus the controller may determine that defrosting is necessary. When there is a lot of ice in the evaporator 20, sufficient heat exchange may not occur in the evaporator 20. Thus, it may be difficult to supply sufficient cold air to the storage compartments 6 and 8. The predetermined pressure P1 may be set to about 20 Pa level. However, the predetermined pressure P1 may vary with considering a capacity, size, etc. of the refrigerator.

The controller 96 drives the heater 50 to supply heat to the evaporator 20 to perform defrosting. The evaporator 20 and the heater 50 are disposed in the same space partitioned inside the case 35. Thus, when the heater 50 is driven, the temperature inside the case 35 may increase and thus the temperature of the evaporator 20 may also increase.

As a result, some of the ice in the evaporator 20 melts into water. Some of the ice may melt away from the evaporator 20 without being attached to the evaporator 20. Accordingly, an area where the evaporator 20 and the air may be in direct thermal contact with each other is increased, so that the heat exchange efficiency of the evaporator 20 may be improved.

During defrosting, i.e., while the heater 50 is running, the evaporator temperature sensor 92 measures the temperature of the evaporator 20. When the temperature of the evaporator 20 is greater than a predetermined temperature T1, the controller determines that the evaporator 20 is sufficiently defrosted S70.

That is, the controller 96 may deactivate the heater 50. The fact that the temperature of the evaporator 20 is higher than the predetermined temperature T1 does not mean that all ice frosted in the evaporator 20 is removed, but may mean that the evaporator 20 is brought into a state in which the evaporator 20 is able to supply sufficient cold air to the storage compartments 6 and 8.

If the temperature of the evaporator 20 is not increased to the predetermined temperature T1, the controller determines that the evaporator 20 is not sufficiently defrosted. Thus, the controller controls the heater 50 so that the heater 50 is continuously driven to supply heat.

In one embodiment, the controller determines the defrosting timing of the evaporator 20 based on the pressure differential measured by the differential pressure sensor 100. In order to improve the reliability of the pressure differential value measured by the differential pressure sensor 100, the controller may add a condition that the air flow inside the case 35 may become stable.

When the heater 50 frequently defrost the evaporator 20 unnecessarily, the heater 50 is frequently driven to increase the power consumed by the heater 50, resulting in overall lower energy efficiency of the refrigerator.

Further, when the heat supplied from the heater 50 flows into the storage compartment 6 and 8 through the inlet or the outlet, food stored in the storage compartment may be altered. Further, in order to cool the air heated by the heat supplied by the heater 50, the evaporator 20 may have to supply more cold air into the storage compartment 6 and 8.

Thus, in one embodiment, the controller may reliably determine the defrosting timing to reduce unnecessary power consumption. Thereby, the refrigerator having improved overall energy efficiency and the method for controlling the refrigerator may be provided.

Figure 6:
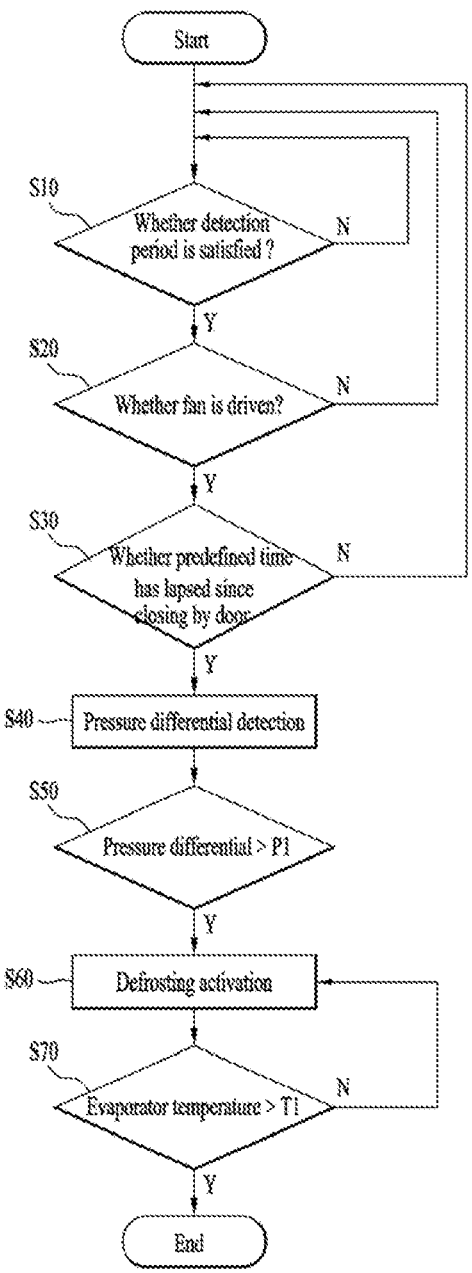
FIG. 6 is a control flow diagram for detecting a frosted amount in an evaporator according to one variant.

FIG. 6 is a control flow chart for detecting a frosted amount in the evaporator according to one modified embodiment.

Unlike the embodiment described in FIG. 5, in the embodiment of FIG. 6, before operation S20, which the controller determines whether the fan is running, the controller determines whether a detection period using the differential pressure sensor 100 is satisfied S10.

The detection period refers to a time interval at which the pressure differential is measured using the differential pressure sensor 100. For example, the detection period may be set to 20 seconds, but this period may be varied based on various conditions.

In this variation embodiment, when the differential pressure sensor 100 measures the pressure differential, the differential pressure sensor 100 detects the pressure differential at the detection period, i.e. the predetermined time interval. Thus, the power consumed by the differential pressure sensor 100 may be reduced.

If, without the detection period, the differential pressure sensor 100 continuously measures the pressure differential, a large amount of power is consumed by the differential pressure sensor 100. Further, power consumed when transmitting the information measured by the differential pressure sensor 100 to the controller 96 may increase.

Thus, in this modified embodiment, the differential pressure sensor 100 measures the pressure differential at the detection period to increase the energy efficiency of the refrigerator.

Since other operations in FIG. 6 are the same as those as described in FIG. 5, redundant descriptions thereof are omitted.

Figure 7:
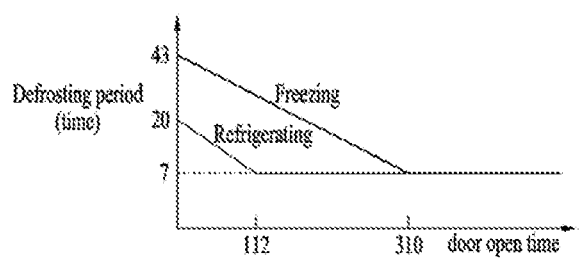
FIG. 7 illustrates a point in time at which defrosting is performed in accordance with another embodiment.

FIG. 7 illustrates a point in time at which defrosting is performed in accordance with another embodiment.

In this embodiment different from the above-described embodiment, the evaporator is divided into an evaporator for a freezing compartment and an evaporator for a refrigerating compartment. That is, the evaporator includes two evaporators.

While the defrosting timing of the evaporator for the freezing compartment may be the same as the defrosting timing of the evaporator for the refrigerating compartment, the defrosting timing of the evaporator for the freezing compartment and the defrosting timing of the evaporator for the refrigerating compartment may be independent from each other. That is, when defrosting is performed in the evaporator for the freezing compartment, at the same time, defrosting is performed on the evaporator for the refrigerating compartment. On the contrary, regardless of the defrosting initiation timing for the evaporator for the freezing compartment, when the defrosting condition for the evaporator for the refrigerating compartment is satisfied, the defrosting of the evaporator for the refrigerating compartment may be performed.

First, the initiation condition of the defrosting for the evaporator for the freezing compartment may be based on a specific time, that is, a time-point at which, for example, the freezing compartment operating duration is reduced from 43 hours to 7 hours. The condition may be based on a maximum of 43 hours, and may be configured such that each time the freezing compartment door is kept open for 1 second, the freezing compartment operating duration may be reduced from 43 hours by 7 minutes and, then, when the freezing compartment operating duration reaches 7 hours, defrosting of the evaporator for the freezing compartment may start.

Defrosting for the evaporator for the refrigerating compartment may start together with the start of evaporator defrosting for the above-mentioned freezing compartment, which may occur when the initiation condition of the evaporator defrosting for the above-mentioned freezing compartment is satisfied. In this case, without considering the initiation condition of defrosting for the evaporator for the refrigerating compartment, defrosting for an evaporator for a refrigerating compartment may be depended on the defrosting for an evaporator for a freezing compartment. In this case, when the heater is driven to defrost the evaporator for the freezing compartment, the defrosting for an evaporator for a refrigerating compartment may start at the same time.

To the contrary, the initiation condition of the defrosting for the evaporator for the refrigerating compartment may be based on a specific time, that is, a time-point at which, for example, the refrigerating compartment operating duration is reduced from 20 hours to 7 hours. The condition may be based on a maximum of 20 hours, and may be configured such that each time the refrigerating compartment door is kept open for 1 second, the refrigerating compartment operating duration may be reduced from 20 hours by 7 minutes and, then, when the refrigerating compartment operating duration reaches 7 hours, defrosting of the evaporator for the refrigerating compartment may start.

Under this condition, the defrosting of the evaporator for the refrigerating compartment can be performed independently, regardless of the defrosting of the evaporator for the freezing compartment. That is, when the defrosting condition for the evaporator for the freezing compartment is satisfied, the defrosting is performed on the evaporator for the freezing compartment. When the defrosting condition for the evaporator for the refrigerating compartment is satisfied, the defrosting of the evaporator for the refrigerating compartment may be performed.

That is, the evaporator defrosting for the freezing compartment and the evaporator defrosting for the refrigerating compartment are performed independently of each other. In this case, even when the heater is driven to defrost the evaporator for the freezing compartment, the defrosting of the evaporator for the refrigerating compartment is not performed if the defrosting condition for the evaporator for the refrigerating compartment is not satisfied.

That is, in this embodiment, the initiation condition of the defrosting for the evaporator for the freezing compartment and the initiation condition of the defrosting for the refrigerating compartment may be separately configured from each other. To the contrary, the controller may match the defrosting timing for the evaporator for the freezing compartment to the defrosting timing for the evaporator for the refrigerating compartment. Further, the controller may the defrosting timing for the evaporator for the refrigerating compartment to the defrosting timing for the evaporator for the freezing compartment.

In FIG. 7, the evaporator is divided into an evaporator for the freezing compartment and an evaporator for the refrigerating compartment. However, when only a single evaporator is installed in the refrigerator, one of the triggering condition of defrosting for the evaporator for the refrigerating compartment and the triggering condition of defrosting for the evaporator for the freezing compartment is selected. Then, when the selected condition is satisfied, defrosting of the evaporator may be started.

Figure 8:
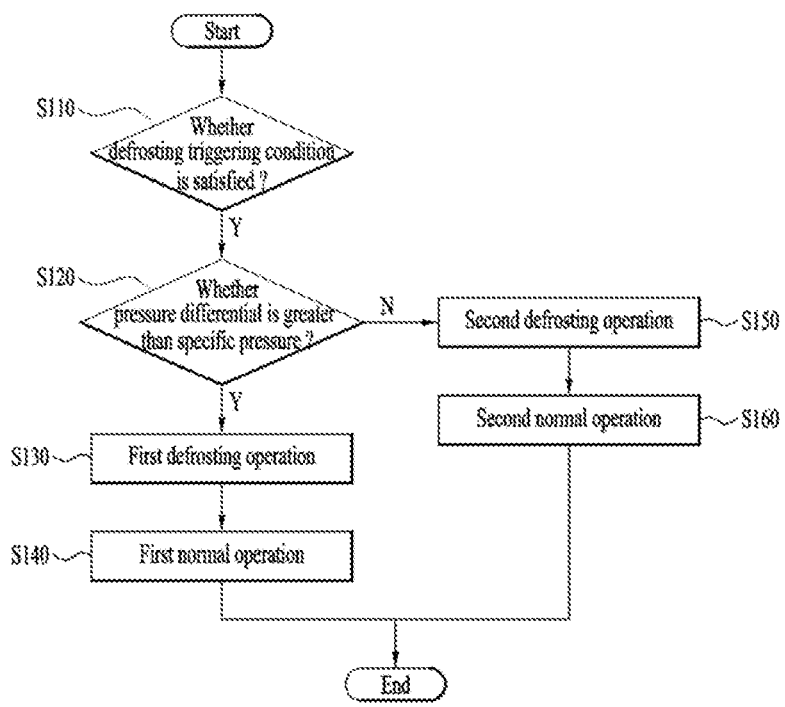
FIG. 8 is a control flow diagram for sensing a frosted amount in the evaporator after defrosting has begun in accordance with another embodiment of the present disclosure.

FIG. 8 is a control flow chart for detecting a frosted amount in the evaporator after the defrosting is started in accordance with another embodiment of the present disclosure.

In this embodiment of FIG. 8, the controller detects the frosted amount for the evaporator. When the frosted amount is low, the controller may also optimize a defrosting logic to reduce the power consumption.

Referring to FIG. 8, first, the controller determines whether the defrosting triggering condition for the evaporator 20 is satisfied. The defrosting triggering condition may be set in consideration of the driving time of the compressor 60 for cooling the storage compartment and the opening time of the door 4, as illustrated in FIG. 7.

In another example, the controller may set another defrosting triggering condition. The controller may use the differential pressure sensor 100 to determine a defrosting triggering condition.

When the defrosting triggering condition is satisfied, the differential pressure sensor 100 detects the pressure differential. Then, when the measured pressure differential value is transferred to the controller 96, the controller determines whether the pressure differential value is greater than a specific pressure S120.

In this connection, the specific pressure may be varied by the user or operator.

When the measured pressure differential is above or equal to the specific pressure, a first defrosting is performed S130.

In the first defrosting, the heater 50 may be driven to dissolve the ice frosted in the evaporator 20.

In this connection, the controller 96 may control the heater 50 to operate to raise the temperature of the evaporator 20 to a first predefined temperature. In this connection, the first predefined temperature may be approximately 5° C.

That is, when the pressure differential measured by the differential pressure sensor 100 is above or equal to the specific pressure, the controller 96 may drive the heater 50 until the temperature of the evaporator 20 rises to the first predefined temperature.

In this connection, until S130 terminates, i.e. the temperature measured by the evaporator temperature sensor 92 has been raised to the first predefined temperature, the controller may continuously drive the heater 50. The controller 96 turns on the heater 50 until the temperature measured by the evaporator temperature sensor 92 is raised to the first predefined temperature, As a result, the ice frosted in the evaporator 20 can be removed.

On the other hand, when the measured pressure differential is lower than the specific pressure, the controller performs a second defrosting S150.

In the second defrosting, the heater 50 may be driven to melt the ice frosted in the evaporator 20.

In this connection, the controller 96 may control the heater to operate so that the temperature of the evaporator 20 is raised to a second predefined temperature. In this connection, the second predefined temperature may be approximately 1° C.

The first predefined temperature may be higher than the second predefined temperature. The second defrosting may end when the temperature of the evaporator 20 reaches a temperature lower than a temperature which the temperature of the evaporator 20 reaches to cause the first defrosting to end.

The amount of the ice frosted in the evaporator 20 was smaller in the second defrosting than that in the first defrosting. Thus, in the second defrosting, the heater may heat the evaporator 20 to the temperature lower than that in the first defrosting.

That is, in this embodiment, the controller estimates the amount of ice frosted in the evaporator 20 using the differential pressure sensor 100. When the ice is frosted at a relatively larger amount, the heater heats the evaporator 20 to a higher temperature. When the ice is frosted at a relatively smaller amount, the heater heats the evaporator 20 to a lower temperature.

When the amount of the ice frosted in the evaporator 20 is small, the heater 50 may provide a relatively small amount of heat to normalize the heat exchange efficiency of the evaporator 20. Since the amount of ice to be dissolved in the evaporator 20 is small, the heater 50 will supply a small amount of heat to defrost the evaporator 20.

Thus, in this embodiment, energy efficiency may be improved when defrosting the evaporator 20.

In one example, during the second defrosting, until the temperature of the evaporator 20 reaches the specific temperature, for example −5° C., the controller may also continuously drive the heater 50 without turning the heater 50 on or off.

On the other hand, when the temperature of the evaporator 20 exceeds the specific temperature, the controller may control the heater such that the heater may be intermittently driven via turning the heater 50 on and off.

During the second defrosting, when the temperature of the evaporator 20 is low, the temperature of the evaporator 20 rises rapidly by the heater 50. When the temperature of the evaporator 20 exceeds the specific temperature, the heater 50 raises the temperature of the evaporator 20 slowly. The controller may be configured such that: when the initial defrosting is performed, the temperature of the evaporator 20 rises rapidly; when the temperature of the evaporator 20 is above or equal to a certain temperature, a time is secured to allow air to circulate between the evaporator 20 and the heater 50 in a convection manner. Therefore, even when the temperature of the evaporator 20 does not rise excessively, the evaporator 20 is exposed to the temperature above the specific temperature, such that the ice frosted in the evaporator may be removed using small energy.

That is, while the second defrosting is being performed, turning-on/off of the heater 50 may be repeated so that the energy consumed by the heater 50 may be saved.

The first defrosting allows the evaporator 20 to be heated up to a higher temperature, while the second defrosting allows the evaporator 20 to be heated to a lower temperature. A target defrosting may be selected between the two defrosting operations depending on the amount of the ice frosted in the evaporator 20.

After the first defrosting is over, a first normal operation mode is performed S140.

The first normal operation mode refers to a process of cooling the storage compartment. In particular, the first normal operation mode may mean first-cooling the storage compartment to a set temperature after the first defrosting has ended. In this connection, the set temperature may mean a storage compartment temperature set by the user or a temperature that has some deviation from a storage compartment temperature set by the user.

In the first normal operation mode, the compressor 60 may be driven to generate a high cooling power.

Since the evaporator 20 has risen to a relatively higher temperature in the first defrosting, a large cooling power is needed to lower the temperature of the evaporator 20. Further, since the internal temperature of the case 35 is increased, the temperature of the storage compartment may rise. Thus, the compressor 60 may be driven at a relatively high rotation RPM to generate a large cooling power to cool the evaporator 20.

After the second defrosting is over, a second normal operation mode is performed S160.

The second normal operation mode refers to a process of cooling the storage compartment. In particular, the second normal operation mode may mean first-cooling the storage compartment to a set temperature after the second defrosting has terminated. In this connection, the set temperature may mean a storage compartment temperature set by the user or a temperature that has some deviation from a storage compartment temperature set by the user.

In the second normal operation mode, the compressor 60 may be driven to generate a low cooling power.

The controller may supply less heat to the heater 50 in the second defrosting than in the first defrosting. Further, since the temperature of the evaporator 20 in the second defrosting is lower compared to that in the first defrosting, the temperature of the storage compartment is not likely to increase in the second defrosting.

Therefore, in the second normal operation mode, the compressor 60 may generate a relatively low cooling power to improve the energy efficiency. In other words, the controller 96 may cool the evaporator 20 slowly by driving the compressor 60 at a relatively lower rotation RPM.

That is, in this embodiment, when the defrosting triggering condition is satisfied, the controller detects the frosted amount in the evaporator 20.

When it determined based on the detected information that the amount as frosted is large, the controller defrosts the evaporator 20 with a lot of energy. When the amount as frosted is small, the controller defrosts the evaporator 20 by injecting less energy.

Adjusting the intensity of the defrosting according to the frosted amount may allow the defrosting reliability of the evaporator 20 to be improved. Further, unnecessary excessive energy consumption may be prevented.

Further, in the present embodiment, the cooling capacity for first-cooling the storage compartment may vary depending on the intensity of the defrosting. When the temperature of the evaporator 20 is high, the compressor 60 is rapidly driven to supply a large amount of cooling power to cool the evaporator 20 rapidly. On the other hand, when the temperature of the evaporator 20 is low, the compressor 60 is driven slowly to provide a small amount of cooling power to cool the evaporator 20 slowly.

Figure 9:
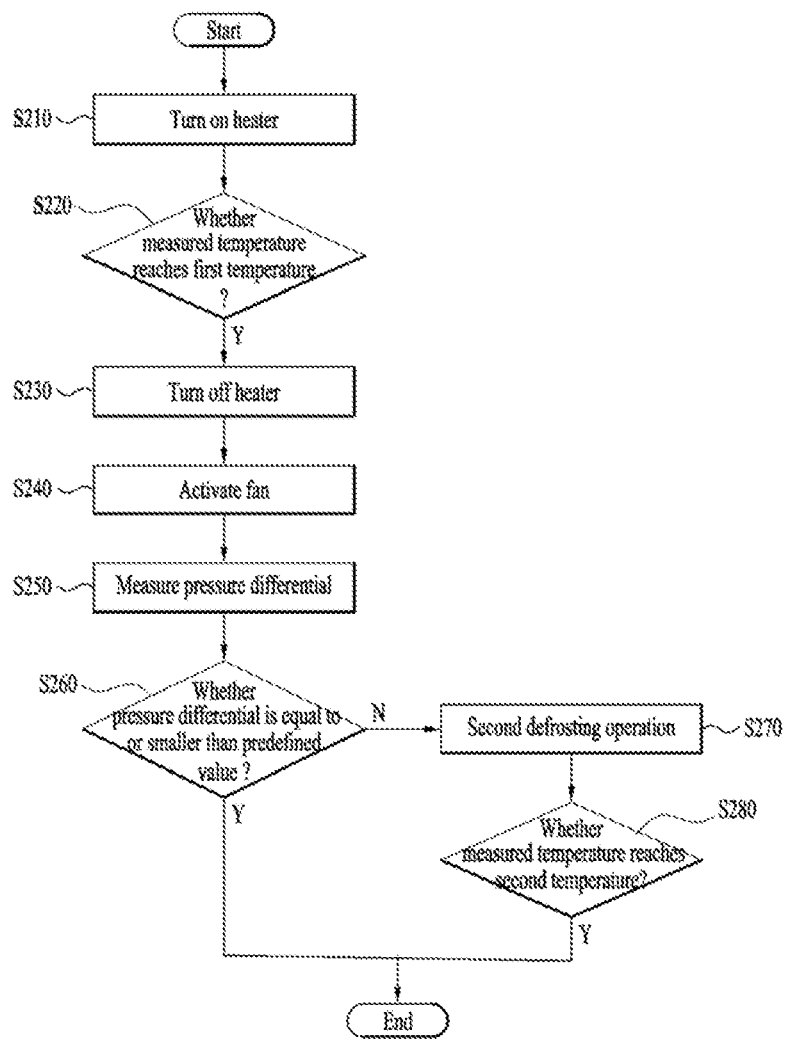
FIG. 9 is a control flow chart for determining whether additional defrosting is required after first defrosting in accordance with another embodiment of the present disclosure.

FIG. 9 is a control flow diagram for determining whether additional defrosting is required after the first defrosting in accordance with another embodiment of the present disclosure.

In this embodiment, after performing the defrosting once, additional defrosting may be performed only when it is determined that the additional defrosting is necessary, thereby saving the energy consumed in defrosting.

When the low intensity of the defrosting has allowed the evaporator 20 to be defrosted sufficiently such that all ice is removed therein, additional defrosting may lead to the larger energy consumption by the heater 50. Further, because the compressor 60 must be operated to lower the elevated temperature resulting from the operation of the heater 50, the energy consumed by the compressor 60 increases.

In this embodiment, in order to solve the above-described problems, the defrosting operation is divided into a first defrosting operation and a second defrosting operation. Then, whether or not to perform the second defrosting operation depends on a remaining frosted amount.

Referring to FIG. 9, in this embodiment, when the defrosting trigger condition for the evaporator 20 is satisfied, the controller drives the heater 50 S210.

The defrosting of the evaporator 20 is performed as the heater 50 is driven.

The evaporator temperature sensor 92 measures the temperature of the evaporator 20.

The controller determines whether the measured temperature has reached a first temperature S220.

When the evaporator 20 reaches the first temperature, the controller determines that defrosting of the evaporator 20 is completed. Thus, the controller turns off the heater 50 S230.

Since the heater 50 is turned off, the controller no longer supplies power to the heater 50.

The controller then drives the fan 40 S240.

The differential pressure sensor 100 may measure the pressure differential via the air flow generated by the fan 40 S250.

The controller determines whether the measured pressure differential is lower than or equal to a predetermined pressure at S260.

When the pressure differential measured by the differential pressure sensor 100 is below or equal to the predetermined pressure, the controller may determine that defrosting of the evaporator 20 has been sufficiently performed. That is, the controller determines that the heat exchange efficiency of the evaporator 20 is higher than a certain level, and thus is able to supply sufficient cold air to the storage compartment.

Thus, the controller determines that additional defrosting of the evaporator 20 is not necessary. Thereafter, the controller may drive the compressor 60 to supply cold air to the storage compartment.

To the contrary, when the pressure differential measured by the differential pressure sensor 100 is greater than the predetermined pressure, the controller may determine that defrosting for the evaporator 20 is insufficient. That is, the heat exchange efficiency of the evaporator 20 does not exceed a certain level. As a result, the evaporator is unable to supply sufficient cold air to the storage compartment.

Therefore, the controller 96 may turn on the heater 50 again to supply heat to the evaporator 20 S270.

After the controller 96 turns on the heater 50, the controller may supply heat to the evaporator 20 until the temperature of the evaporator 20 reaches a second temperature.

Then, when the temperature of the evaporator 20 reaches the second temperature, the controller determines that the additional defrosting is completed and ends the entire defrosting at S280.

After the defrosting is finished in S260 or S280, a normal operation mode in which the compressor 60 for cooling the storage compartment is driven is performed.

When the pressure differential measured in the operation S250 is below or equal to the predetermined pressure, the second defrosting operation S270 and S280 are not performed. The normal operation mode is performed.

To the contrary, when the pressure differential measured in S250 is greater than the predetermined pressure, the second defrosting operation S270 and S280 are performed, and, then, the normal operation mode is performed.

In the normal operation mode, the controller drives the fan 40, which supplies heat-exchanged air in the evaporator 20 to the storage compartment. That is, the refrigerant compressed by the compressor 60 is supplied to the evaporator 20. Thus, the air is cooled via heat exchange with the evaporator 20. In this connection, the cooled air is guided to the storage compartment via the fan 40.

In one example, the second temperature of the second defrosting operation performed in S270 may be equal to the first temperature of the first defrosting operation performed in S210.

After the fan 40 is driven, the evaporator 20 exchanges heat with the incoming air from the storage compartment, such that the temperature of the evaporator is lowered. After the fan 40 is driven, the heater 50 may again heat the evaporator 20 to the same second temperature as the first temperature.

Even though the first temperature and the second temperature are the same, the temperature of the evaporator 20 is lowered by the fan 40, the evaporator 20 is exposed to a temperature at which ice can be removed for a long time. Thus, in the first defrosting operation and the second defrosting operation, the ice frosted in the evaporator 20 may be removed.

Alternatively, the second temperature of the second defrosting operation performed in S270 may be higher than the first temperature of the first defrosting operation performed in S210.

In the second defrosting operation, the heater 50 may supply more heat to the evaporator 20 to remove the remaining ice from the evaporator 20.

In the second defrosting operation, the evaporator 20 rises to a relatively high second temperature. Thus, unremoved ice after the first defrosting operation may be removed. Therefore, the defrosting reliability of the evaporator 20 may be improved.

Since in the second defrosting operation, the evaporator temperature rises up to a higher temperature, the evaporator is exposed to the higher temperature than in the first defrosting operation. Further, for the evaporator, a time for which the ice may melt may be secured in a corresponding manner to the first defrosting operation and during the second defrosting operation. The total time for which the ice may melt may increase.

Therefore, ice frosted in the evaporator 20 may be removed additionally via the second defrosting operation, which may improve the reliability of defrosting.

In one example, after the operation driving the fan 40 is driven for a specific time, S250 may be performed. At the moment when the fan 40 is driven, the flow of air inside the case 35 is unstable. Thus, noisy values may be measured by the differential pressure sensor 100. Thus, the pressure differential value measured by the differential pressure sensor 100 after the fan 40 has been driven for the specific time, for example, approximately 5 seconds may be employed. It is desirable to use this pressure differential value to detect the amount of remaining ice in the evaporator 20.

In one example, S240 is preferably performed after S230 is performed and then a predetermined time has elapsed.

Until S230 is performed, the heater 50 is powered and releases heat. In one example, since though the heater 50 is turned off, there is residual heat in the heater, the heater may raise the temperature inside the case 35 for a certain amount of time.

Thus, when as soon as the heater 50 is turned off, the fan 40 is driven, hot air is supplied to the storage compartment via the air flow generated by the fan 40. When the temperature of the storage compartment rises, there is a risk that the stored food may deteriorate.

In this embodiment, in a predetermined time, for example, in an idle time of approximately one minute after the first defrosting is terminated, that is, after the heater 50 is turned off, the controller drives the fan 40. Thus, the air heated by the heater 50 may be prevented from being supplied to the storage compartment without melting the ice frosted in the evaporator 20.

Further, it is desirable not to drive the fan 40 in the first defrosting operation and the second defrosting operation. This may disallow the hot air heated by the heater 50 to be supplied to the storage compartment via the fan 40.

In other words, it is preferable not to drive the fan 40 when the heater 50 is turned on because the heater 50 generates heat.

The present disclosure is not limited to the embodiments described above. It is to be understood that the present disclosure is susceptible of modification by one of ordinary skill in the art to which the present disclosure belongs and that such modifications are within the scope of the present disclosure.

INDUSTRIAL APPLICABILITY

The present disclosure provides an energy efficient refrigerator and a method for controlling the refrigerator.

What is claimed is:

1. A method for controlling a refrigerator including a cabinet that defines a storage compartment therein, an evaporator, a case that accommodates the evaporator and that defines an inlet configured to receive air from the storage compartment and an outlet configured to discharge air into the storage compartment, and a differential pressure sensor configured to detect a difference of air pressure between positions of the case, the method comprising:
performing a first defrosting operation of the evaporator;
terminating the first defrosting operation of the evaporator based on a temperature of the evaporator being greater than a first temperature;
detecting, by the differential pressure sensor, a pressure differential corresponding to a difference of air pressure between (i) a first air pressure at a first through-hole that is defined between the inlet and the evaporator and (ii) a second air pressure at a second through-hole that is defined between the outlet and the evaporator;

performing a second defrosting operation of the evaporator based on the pressure differential being greater than a predetermined pressure; and terminating the second defrosting operation of the evaporator based on the temperature of the evaporator being greater than a second temperature that is greater than the first temperature.

2. The method of claim 1, further comprising:

based on the pressure differential being less than the predetermined pressure, performing a cooling operation to cool the storage compartment by driving a compressor configured to compress refrigerant.

3. The method of claim 2, further comprising:

based on the pressure differential being greater than the predetermined pressure, performing the cooling operation after terminating the second defrosting operation.

4. The method of claim 2, wherein performing the cooling operation comprises driving a fan configured to supply air heat-exchanged with the evaporator to the storage compartment.

5. The method of claim 1, wherein each of performing the first defrosting operation and performing the second defrosting operation comprises driving a heater configured to heat the evaporator.

6. A method for controlling a refrigerator including a cabinet that defines a storage compartment therein, an evaporator, a case that accommodates the evaporator and that defines an inlet configured to receive air from the storage compartment and an outlet configured to discharge air into the storage compartment, and a differential pressure sensor configured to detect a difference of air pressure between positions of the case, the method comprising:

performing a first defrosting operation of the evaporator;

terminating the first defrosting operation of the evaporator based on a temperature of the evaporator being greater than a first temperature;

detecting, by the differential pressure sensor, a pressure differential corresponding to a difference of air pressure between (i) a first air pressure at a first through-hole that is defined between the inlet and the evaporator and (ii) a second air pressure at a second through-hole that is defined between the outlet and the evaporator;

performing a second defrosting operation of the evaporator based on the pressure differential being greater than a predetermined pressure; and terminating the second defrosting operation of the evaporator based on the temperature of the evaporator being greater than a second temperature that is equal to the first temperature.

7. The method of claim 1, further comprising:

between performing the first defrosting operation and detecting the pressure differential, activating a fan configured to supply air heat-exchanged with the evaporator to the storage compartment.

8. The method of claim 7, wherein detecting the pressure differential comprises detecting the pressure differential based on a lapse of time after activating the fan.

9. The method of claim 7, wherein activating the fan comprises activating the fan based on a lapse of predetermined time after terminating the first defrosting operation.

10. The method of claim 1, wherein performing the first defrosting operation comprises performing the first defrosting operation based on deactivating a fan configured to supply air heat-exchanged with the evaporator to the storage compartment, and wherein performing the second defrosting operation comprises performing the second defrosting operation based on deactivating the fan.

11. A method for controlling a refrigerator including a cabinet that defines a storage compartment therein, an evaporator, a case that accommodates the evaporator and that defines an inlet configured to receive air from the storage compartment and an outlet configured to discharge air into the storage compartment, and a differential pressure sensor configured to detect a difference of air pressure between positions of the case, the method comprising:

performing a first defrosting operation of the evaporator;

terminating the first defrosting operation of the evaporator based on a temperature of the evaporator being greater than a first temperature;

detecting, by the differential pressure sensor, a pressure differential corresponding to a difference of air pressure between (i) a first air pressure at a first through-hole that is defined between the inlet and the evaporator and (ii) a second air pressure at a second through-hole that is defined between the outlet and the evaporator and vertically above the first through-hole; and performing a second defrosting operation of the evaporator based on the pressure differential being greater than a predetermined pressure, wherein the differential pressure sensor comprises:

a connector disposed at an upper end of the differential pressure sensor, a first pipe that defines the first through-hole and extends from the first through-hole to the connector, and a second pipe that defines the second through-hole and extends from the second through-hole to the connector, a length of the second pipe being less than a length of the first pipe.

12. The method of claim 11, further comprising:

terminating the second defrosting operation of the evaporator based on the temperature of the evaporator being greater than a second temperature that is greater than or equal to the first temperature.

* * * * *